US009260081B2

(12) United States Patent
Willey et al.

(10) Patent No.: US 9,260,081 B2
(45) Date of Patent: *Feb. 16, 2016

(54) WIPER APPARATUSES, MOTOR VEHICLES HAVING WIPER APPARATUSES, AND METHODS FOR OPERATING WIPER APPARATUSES

(71) Applicant: GM Global Technology Operations LLC, Detroit, MI (US)

(72) Inventors: Mark R. Willey, Grand Blanc, MI (US); Thomas W. Cox, Lapeer, MI (US); Marcia R. Ganske, Davisburg, MI (US); Mark K. Denison, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 348 days.

This patent is subject to a terminal disclaimer.

(21) Appl. No.: 13/754,480

(22) Filed: Jan. 30, 2013

(65) Prior Publication Data

US 2014/0210382 A1   Jul. 31, 2014

(51) Int. Cl.
*H02P 1/04* (2006.01)
*B60S 1/08* (2006.01)
*B60S 1/04* (2006.01)

(52) U.S. Cl.
CPC ............. *B60S 1/08* (2013.01); *B60S 1/0452* (2013.01); *B60S 1/0803* (2013.01)

(58) Field of Classification Search
USPC .................................. 318/443, 445, 466, 468
See application file for complete search history.

(56) References Cited

U.S. PATENT DOCUMENTS

| | | | | |
|---|---|---|---|---|
| 3,602,937 A * | 9/1971 | Kelley | ........................ | 15/250.13 |
| 5,142,728 A * | 9/1992 | Yamamoto et al. | ......... | 15/250.13 |
| 5,355,061 A * | 10/1994 | Forhan | ........................... | 318/443 |
| 5,570,488 A * | 11/1996 | Deng | .......................... | 15/250.16 |
| 6,381,800 B1 * | 5/2002 | Buchanan et al. | ......... | 15/250.31 |
| 7,309,970 B2 * | 12/2007 | Gao | .............................. | 318/443 |
| 7,764,034 B2 * | 7/2010 | Willey | ........................ | 318/443 |
| 8,327,497 B2 * | 12/2012 | Cox et al. | .................... | 15/250.17 |
| 2007/0194735 A1 | 8/2007 | Gao | | |
| 2009/0108788 A1 | 4/2009 | Willey | | |
| 2009/0254219 A1 | 10/2009 | Willey et al. | | |
| 2012/0047672 A1 | 3/2012 | Cox et al. | | |

FOREIGN PATENT DOCUMENTS

DE    102011110008 A1    3/2012

* cited by examiner

*Primary Examiner* — Rina Duda
(74) *Attorney, Agent, or Firm* — Ingrassia Fisher & Lorenz, P.C.

(57) ABSTRACT

Wiper apparatuses are provided herein. In one example, a wiper apparatus includes a wiper that has a wiper arm and a wiper blade. The wiper blade is mounted to the wiper arm for contact with a window of a motor vehicle. A wiper drive motor pivots the wiper arm between an out-wipe position and an in-wipe position. A controller controls operation of the wiper drive motor to cause the wiper drive motor to selectively stop the wiper blade in a standard park position when in a standard park mode and in a high park position when in a high park mode. The wiper blade in the high park position is located further up from a bottom edge of the window than in the standard park position. A wiper control switch causes the controller to toggle between the standard park mode and the high park mode when moved according to a predetermined switching sequence.

16 Claims, 2 Drawing Sheets

WIPER APPARATUSES, MOTOR VEHICLES HAVING WIPER APPARATUSES, AND METHODS FOR OPERATING WIPER APPARATUSES

TECHNICAL FIELD

The technical field generally relates to window wipers for motor vehicles, and more particularly relates to wiper apparatuses that have a selectable high park position on a window of a motor vehicle, motor vehicles having such wiper apparatuses, and methods for operating such wiper apparatuses.

BACKGROUND

Conventional windshield wiper apparatuses moved the windshield wipers back and forth between an out-wipe position (e.g., furthest position out on the windshield) and an in-wipe position (e.g., lowest position on the windshield) to remove water and debris from the windshield of a motor vehicle. The in-wipe and out-wipe positions are spaced apart to generally maximize the coverage of the windshield wiper blades on the windshield. When the windshield wipers are turned off, the windshield wipers stop in a park position, which is proximate to the in-wipe position, e.g., typically at the in-wipe position or slightly below in a depressed park position. Thus, to minimize wind noise and improve driver visibility, the windshield wiper in-wipe position is placed as low as practicable, which is typically along the base of the windshield.

During winter months, ice and/or snow can build-up near the base of the windshield where it is in direct contact with the windshield wipers when they are in the park position. The ice and/or packed snow can cause the windshield wipers to freeze directly to the windshield and/or reduce the wipe quality of the windshield wipers against the windshield, thereby reducing visibility of the motor vehicle occupants.

Accordingly, it is desirable to provide wiper apparatuses for windows of motor vehicles that reduce the potential for ice and snow build-up on the wipers, motor vehicles having such wiper apparatuses, and methods for operating such wiper apparatuses. Furthermore, other desirable features and characteristics of the present invention will become apparent from the subsequent detailed description and the appended claims, taken in conjunction with the accompanying drawings and the foregoing technical field and background.

BRIEF SUMMARY

A wiper apparatus for removing water and debris from a window of a motor vehicle is provided herein. In one embodiment, the wiper apparatus includes a wiper that has a wiper arm and a wiper blade. The wiper blade is mounted to the wiper arm and is configured to contact the window. A wiper arm pivot is for pivotally securing the wiper arm relative to the window. A wiper drive motor is configured to pivot the wiper arm between an out-wipe position and an in-wipe position. A controller is configured to communicate with and control operation of the wiper drive motor to cause the wiper drive motor to selectively stop the wiper blade in a standard park position when in a standard park mode and in a high park position when in a high park mode. The wiper blade in the high park position is located further up from a bottom edge of the window than in the standard park position. A wiper control switch is configured to communicate with the controller and to cause the controller to toggle between the standard park mode and the high park mode when moved according to a predetermined switching sequence.

A motor vehicle having a window is provided herein. In one embodiment, the motor vehicle includes a wiper apparatus for removing water and debris from the window. The wiper apparatus includes a wiper that has a wiper arm and a wiper blade. The wiper blade is mounted to the wiper arm and is in contact with the window. A wiper arm pivot pivotally secures the wiper arm to the motor vehicle relative to the window. A wiper drive motor is configured to pivot the wiper arm between an out-wipe position and an in-wipe position. A controller is in communication with the wiper drive motor and is configured to control operation of the wiper drive motor to cause the wiper drive motor to selectively stop the wiper blade in a standard park position when in a standard park mode and in a high park position when in a high park mode. The wiper blade in the high park position is located further up from a bottom edge of the window than in the standard park position. A wiper control switch is in communication with the controller and is configured to cause the controller to toggle between the standard park mode and the high park mode when moved according to a predetermined switching sequence.

A method for operating a wiper apparatus for removing water and debris from a window of a motor vehicle is provided. In one embodiment, the method includes moving a wiper control switch according to a predetermined switching sequence to set a park position for a wiper in contact with the window to a standard park position or a high park position. The wiper in the high park position is located further up from a bottom edge of the window than in the standard park position. The wiper is pivoted back and forth between an in-wipe position and an out-wipe position. If the park position is set to the standard park position, then the wiper is parked by stopping movement of the wiper when the wiper is in the standard park position. If the park position is set to the high park position, then the wiper is parked by stopping movement of the wiper when the wiper is in the high park position.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any theory presented in the preceding technical field, background, brief summary or the following detailed description.

Various embodiments contemplated herein relate to wiper apparatuses for removing water and debris from a window of a motor vehicle, motor vehicles having such wiper apparatuses, and methods for operating such wiper apparatuses. The exemplary embodiments taught herein provide a wiper apparatus with a wiper that includes a wiper arm and a wiper blade. The wiper blade is mounted to the wiper arm and is in contact with the window. A wiper arm pivot pivotally secures the wiper arm to the motor vehicle relative to the window and a wiper drive motor pivots the wiper arm between an out-wipe position and an in-wipe position. A controller is in communication with and controls operation of the wiper drive motor to cause the wiper drive motor to selectively stop the wiper blade in a standard park position when in a standard park mode and in a high park position when in a high park mode. The wiper blade in the high park position is located further up from a bottom edge of the window than in the standard park position.

During the winter months, for example, less ice and/or snow typically accumulate along the windshield area that corresponds to the high park position compared to the low park position near the bottom edge or base of the windshield. A wiper control switch is in communication with the controller to cause the controller to toggle between the standard park mode and the high park mode when moved according to a predetermined switching sequence. As such, an occupant of the motor vehicle can select the high park mode, for example, when the chance of ice and snow accumulation is likely by moving the wiper control switch according to the predetermined switching sequence so that when the wiper blade is stopped (e.g., via turning off the wiper apparatus, turning off the motor vehicle, or between intermittent time-delay interval wipes), the wiper blade will park in the high park position to help reduce the potential for ice and/or snow build-up on the wiper.

Figure 1:
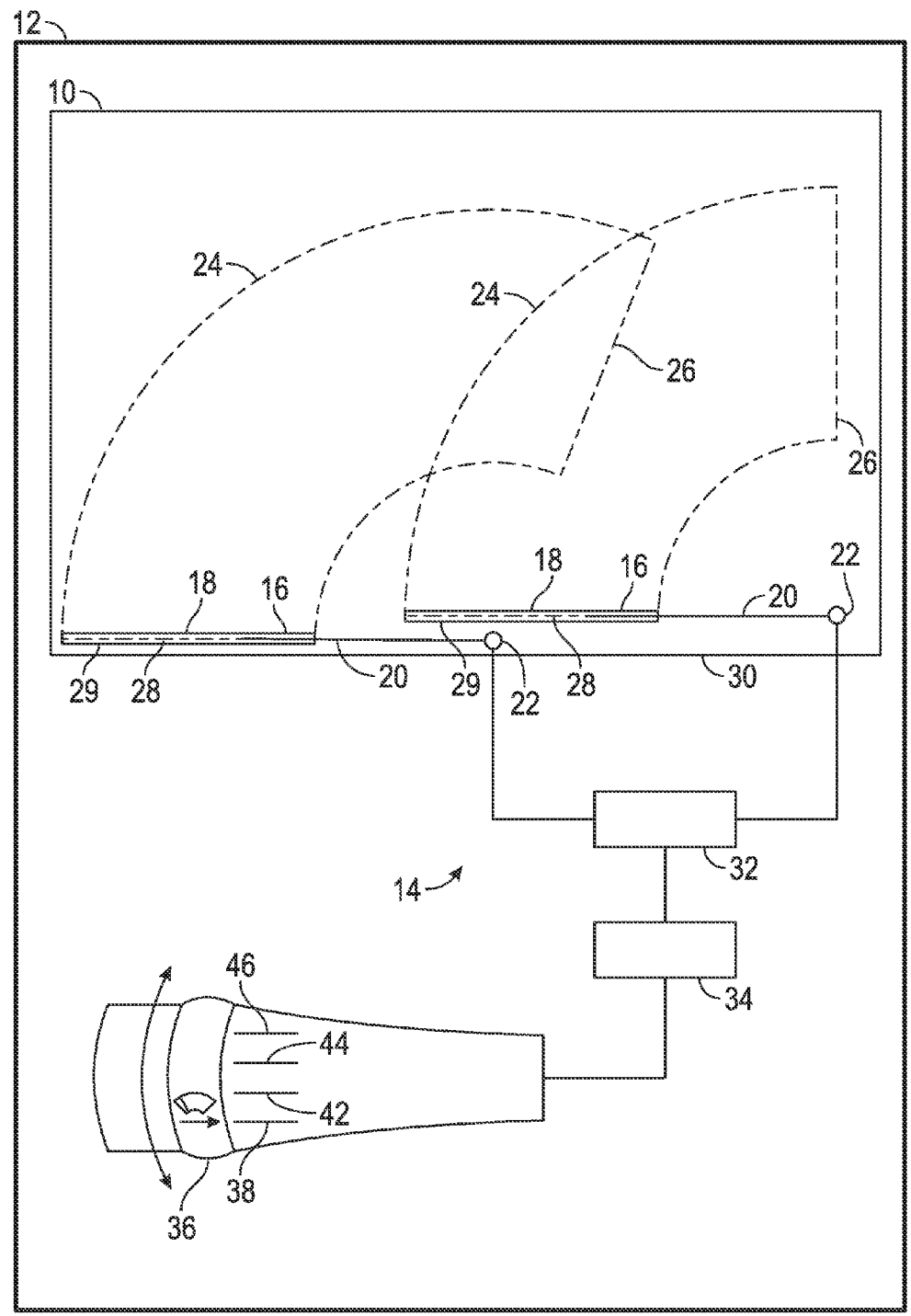
FIG. 1 is a schematic frontal view of a motor vehicle windshield and a wiper apparatus in accordance with an embodiment.
Figure 2:
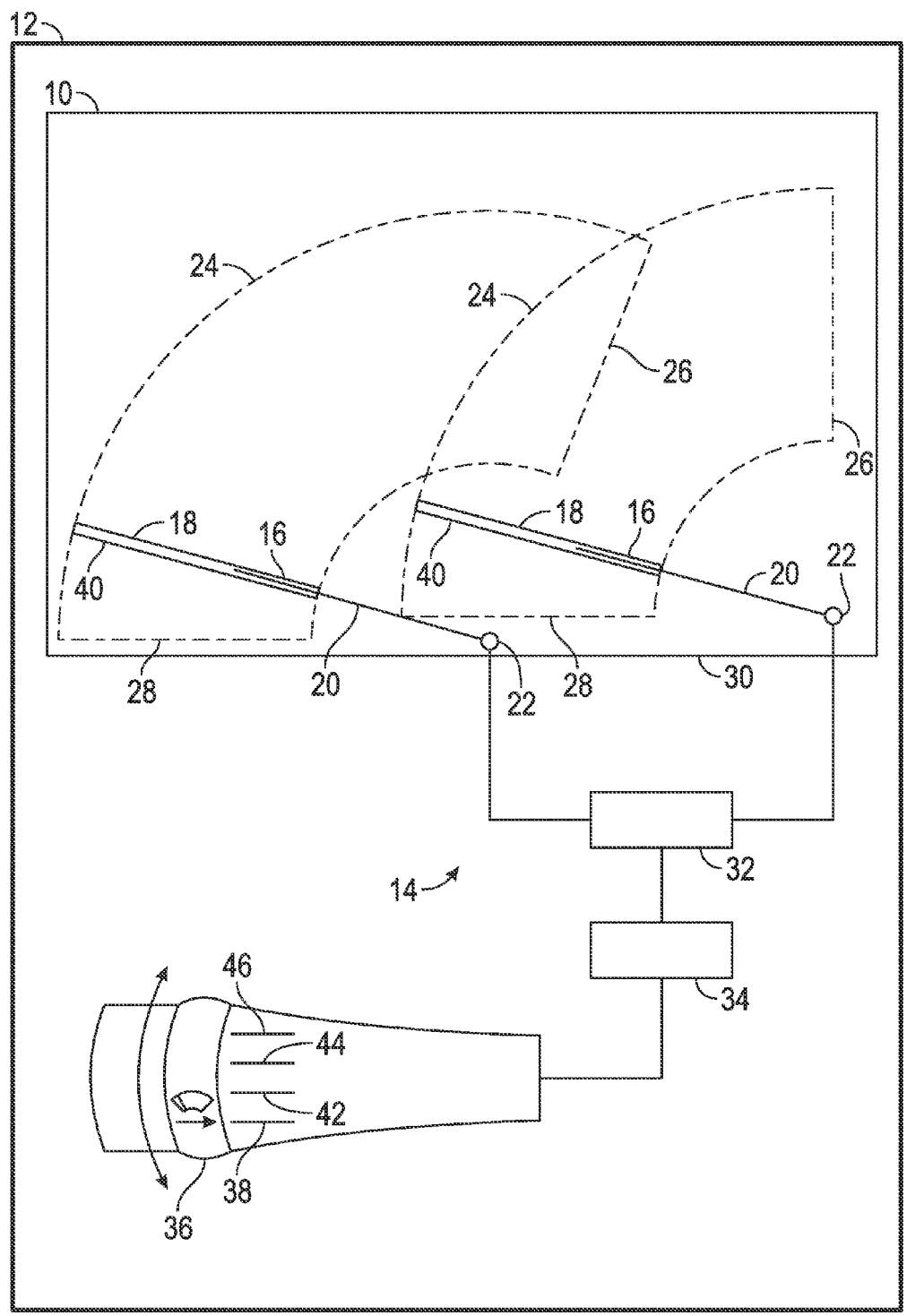
FIG. 2 is a schematic frontal view of a motor vehicle windshield and a wiper apparatus in accordance with an embodiment.

Referring to FIGS. 1 and 2, schematic frontal views of a windshield 10 of a motor vehicle 12 and a wiper apparatus 14 in accordance with an embodiment are provided. As illustrated, the wiper apparatus 14 is configured as a tandem front wiper system. The wiper apparatus 14 includes a pair of wipers 16, each having a wiper blade 18 mounted on a wiper arm 20. The wiper arms 20 are each secured to the motor vehicle 12 by a wiper arm pivot 22 about which the wipers 16 rotate. Although the pair of wipers 16 is shown in the tandem arrangement, it is to be understood that the wiper apparatus 14 can have a single wiper, such as, for example, a large wiper that is configured to wipe practically the entire windshield 10, if desired.

The wiper blades 18 contact the glass of the windshield 10 and correspondingly pivot back and forth over a glass coverage area 24 (shown with phantom lines), which is an area where the wiper blades 18 contact the windshield 10. As shown, the wiper blades 18 pivot clockwise up to an out-wipe position 26, which is the maximum location of coverage in the clockwise direction. Further, the wiper blades 18 pivot counterclockwise down to an in-wipe position 28, which is the maximum location of coverage in the counterclockwise direction. In an exemplary embodiment, the in-wipe position 28 is also the standard park position 29 where the wipers 16 are typically parked when they are not being used to remove water and/or debris from the windshield 10. In particular, the wipers 16 as shown in FIG. 1 are in a standard park position 29, which is near a bottom edge 30 of the windshield 10.

The wiper apparatus 14 also includes a wiper drive motor 32 that drives the wipers 16 back and forth across the windshield 10. The wiper drive motor 32 is controlled by a controller 34, which may be a body control module for the motor vehicle 12, for example. A wiper control switch 36 is in communication with the controller 34. The wiper control switch 36 can be manipulated by an occupant of the motor vehicle 12 to indicate the desired wiper function including turning on and off the wipers 16. The wiper control switch 36 relays the switch position/function to the controller 34, which then controls the timing and function of the wiper operation. For example, when the wipers 16 are operating and the occupant turns the wiper control switch 36 to the off wiper switch position 38, the controller 34 will then determine when to cease operations of the wiper drive motor 32 so that the wipers 16 stop at a desired park position.

In an embodiment, the controller 34 can be set in a standard park mode so that the wiper drive motor 32 stops the wipers 16 at the standard park position 29 as discussed above, or alternatively, can be set in a high park mode so that the wiper drive motor 32 stops the wipers 16 at a high park position 40 as illustrated in FIG. 2. In the high park position 40, the wipers 16 are located further up from the bottom edge 30 of the windshield 10 than in the standard park position 29. As such, the wipers 16 in the high park position are located along the windshield 10 where less ice and/or snow are likely to accumulate, e.g., during the winter months, and also where warm defrost air can be directed from the motor vehicle's climate control system along the inside surface of the windshield 10 to help melt and clear any ice and/or snow that may be present.

In an embodiment, the controller 34 can be toggled from the standard park mode to the high park mode or vice versa by moving the wiper control switch 36 according to a predetermined switching sequence to set the park position for the wipers 16. In one embodiment, the predetermined switching sequence is defined by cycling the wiper control switch 36 between predetermined control switch positions, e.g., the off wiper switch position 38, an intermittent timed-delay switch position 42, a low-speed wiper switch position 44, and/or a high-speed wiper switch position 46) for a predetermined number of cycles within a predetermined amount of time. In one example, the wiper control switch 36 is moved from the low-speed wiper switch position 44 to the high-speed wiper switch position 46 or vice versa at least three times (e.g. defining at least three cycles), such as five times or more (e.g., defining at least five cycles), within a predetermined amount of time of about 15 seconds or less, such as about 10 seconds or less, such as from about 1 to about 10 seconds, for example about 8 seconds.

In an embodiment, the controller 34 is set to the high park mode by moving the wiper control switch 36 according to the predetermined switching sequence. When the wiper control switch 36 is later moved to the off wiper switch position 38 or when the motor vehicle 12 is turned off, the wipers 16 are stopped in the high park position 40. Thereafter, when the wiper control switch 36 is moved from the off wiper switch position 38 to another wiper switch position, e.g., the intermittent timed-delay switch position 42, the low-speed wiper switch position 44, or the a high-speed wiper switch position 46, or when the motor vehicle 12 is turned on (e.g., the motor vehicle's engine is started), the controller 34 is automatically reset to the standard park mode.

In an embodiment, while the wiper apparatus 14 is operating (e.g., turned on), the wiper drive motor 32 is employed to move the wipers 16 back and forth between the out-wipe position 26 and the in-wipe position 28. When the wipers 16 are no longer needed to remove water and/or debris from the windshield 10, the occupant can move the wiper control switch 36 to the off wiper switch position 38 to turn off the wiper apparatus 14 and move the wipers 16 to the park position (e.g., the standard park position 29 where the high park position 40). Alternatively, if the wiper control switch 36 is in the intermittent timed-delay switch position 42, the wipers 16 will move to the park position between intermittent timed-delay interval wipes.

In an embodiment, to accomplish moving the wipers 16 to the park position, the controller 34 receives a park signal from the wiper drive motor 32 to determine when the wipers 16 is entering the in-wipe position 28. If the controller 34 is in the standard park mode, the wiper drive motor 32 stops the wipers 16 in the standard park position 29. This may require the controller 34 to use hardware and/or software interrupt to read the park switch to immediately stop the wipers 16 upon reaching the standard park position 29. Alternatively, if the controller 34 is in the high park mode, the controller starts a timer, which may be part of the controller 34 or separate from the controller 34, for a predetermined time. The wiper drive motor 32 stops the wipers 16 in the high park position 40 when the Park signal from the wiper drive motor 32 has been received and the timer has indicated that the predetermined time has expired. This operation of stopping the wiper drive motor 32 in the high park position 40 may also require the controller 34 to apply a software interrupt in order to immediately stop the wipers 16 upon timer expiration. In yet another embodiment, some smart wiper systems may continuously track the absolute wiper positions across the wipe pattern. In these systems, the controller 34 may just stop the wipers 16 in the high park position 40 without implying a timer.

Accordingly, wiper apparatuses for removing water and debris from a window of a motor vehicle, motor vehicles having such wiper apparatuses, and methods for operating such wiper apparatuses have been described. The exemplary embodiments taught herein provide a wiper apparatus with a wiper that includes a wiper arm and a wiper blade. A wiper drive motor pivots the wiper arm between an out-wipe position and an in-wipe position. A controller controls operation of the wiper drive motor to cause the wiper drive motor to selectively stop the wiper in a standard park position when in a standard park mode and in a high park position when in a high park mode. The wiper in the high park position is located further up from a bottom edge of the window than in the standard park position. A wiper control switch is in communication with the controller to cause the controller to toggle between the standard park mode and the high park mode when moved according to a predetermined switching sequence.

While at least one embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes may be made in the function and arrangement of elements without departing from the scope of the disclosure as set forth in the appended claims and the legal equivalents thereof.

What is claimed is:

1. A wiper apparatus for removing water and debris from a window of a motor vehicle, the wiper apparatus comprising:
   a wiper comprising a wiper arm and a wiper blade that is mounted to the wiper arm and that is configured to contact the window;
   a wiper arm pivot for pivotally securing the wiper arm relative to the window;
   a wiper drive motor configured to pivot the wiper arm between an out-wipe position and an in-wipe position;
   a controller configured to communicate with and control operation of the wiper drive motor to cause the wiper drive motor to selectively stop the wiper blade in a standard park position when in a standard park mode and in a high park position when in a high park mode, wherein the wiper blade in the high park position is located further up from a bottom edge of the window than in the standard park position; and
   a wiper control switch configured to communicate with the controller and to cause the controller to toggle between the standard park mode and the high park mode when moved according to a predetermined switching sequence, wherein the predetermined switching sequence is defined by cycling the wiper control switch between predetermined control switch positions for a predetermined number of cycles within a predetermined amount of time.

2. The wiper apparatus of claim 1, wherein the controller is configured to park the wiper blade in the standard park position or the high park position when the wiper control switch is moved to an off position, the motor vehicle is turned off, or between intermittent timed-delay interval wipes.

3. The wiper apparatus of claim 1, wherein the predetermined control switch positions include a low speed wiper switch position and a high speed wiper switch position.

4. The wiper apparatus of claim 1, wherein the predetermined number of cycles is at least 3.

5. The wiper apparatus of claim 1, wherein the predetermined amount of time is about 15 seconds or less.

6. The wiper apparatus of claim 1, wherein the controller is configured to toggle back from the high park mode to the standard park mode when the wiper control switch is moved again according to the predetermined switching sequence.

7. The wiper apparatus of claim 1, wherein the controller is configured to stop the wiper blade in the high park position when in the high park mode and the motor vehicle is turned off.

8. The wiper apparatus of claim 7, wherein the controller is configured to reset to the standard park mode from the high park mode when the motor vehicle is turned on.

9. The wiper apparatus of claim 1, wherein the controller is configured to stop the wiper blade in the high park position when in the high park mode and the wiper control switch is moved to a wiper off position.

10. The wiper apparatus of claim 9, wherein the controller is configured to reset to the standard park mode from the high park mode when the wiper control switch is moved from the wiper off position to another wiper switch position.

11. The wiper apparatus of claim 1, wherein the controller is configured to detect a park signal from the wiper drive motor to determine when the wiper blade is entering the in-wipe position to stop the wiper blade in the standard park position when in the standard park mode.

12. The wiper apparatus of claim 1, further comprising a timer that is separate from or part of the controller, wherein the controller is configured to detect a park signal from the wiper drive motor to determine when the wiper blade is entering the in-wipe position to start the timer for a predetermined time and to stop the wiper blade in the high park position when in the high park mode and the timer has indicated that the predetermined time has expired.

13. A motor vehicle having a window and comprising:
   a wiper apparatus for removing water and debris from the window, the wiper apparatus comprising:
      a wiper comprising a wiper arm and a wiper blade that is mounted to the wiper arm and that is in contact the window;
      a wiper arm pivot pivotally securing the wiper arm to the motor vehicle relative to the window;
      a wiper drive motor configured to pivot the wiper arm between an out-wipe position and an in-wipe position;

a controller in communication with the wiper drive motor and configured to control operation of the wiper drive motor to cause the wiper drive motor to selectively stop the wiper blade in a standard park position when in a standard park mode and in a high park position when in a high park mode, wherein the wiper blade in the high park position is located further up from a bottom edge of the window than in the standard park position; and a wiper control switch in communication with the controller and configured to cause the controller to toggle between the standard park mode and the high park mode when moved according to a predetermined switching sequence, wherein the predetermined switching sequence is defined by cycling the wiper control switch between predetermined control switch positions for a predetermined number of cycles within a predetermined amount of time, wherein the window is a windshield and the motor vehicle is configured to direct defrost air onto a lower defrost portion of the windshield, and wherein the wiper blade is disposed overlying the lower defrost portion of the windshield when in the high park position.

14. The motor vehicle of claim 13, wherein the wiper apparatus further comprises:

a second wiper comprising a second wiper arm and a second wiper blade that is mounted to the second wiper arm and that is configured to contact the window; and a second wiper arm pivot for pivotally securing the second wiper arm to the motor vehicle relative to the window, wherein the wiper drive motor is configured to pivot the second wiper arm between a second out-wipe position and a second in-wipe position, wherein the controller is configured to communicate with and control operation of the wiper drive motor to cause the wiper drive motor to selectively stop the second wiper blade in a second standard park position when in the standard park mode and in a second high park position when in the high park mode, wherein the second wiper blade in the high park position is located further up from the bottom edge of the window than in the standard park position.

15. A method for operating a wiper apparatus for removing water and debris from a window of a motor vehicle, the method comprising the steps of:

moving a wiper control switch according to a predetermined switching sequence to set a park position for a wiper in contact with the window to a standard park position or a high park position, wherein the wiper in the high park position is located further up from a bottom edge of the window than in the standard park position, wherein moving the wiper control switch comprises cycling the wiper control switch between predetermined control switch positions for a predetermined number of cycles within a predetermined amount of time to set the park position for the wiper;

pivoting the wiper back and forth between an in-wipe position and an out-wipe position; and parking the wiper, wherein if the park position is set to the standard park position, then the wiper is parked by stopping movement of the wiper when the wiper is in the standard park position, and wherein if the park position is set to the high park position, then the wiper is parked by stopping movement of the wiper when the wiper is in the high park position.

16. The method of claim 15, wherein the step of parking comprises:

determining when the wiper is entering the in-wipe position to start a timer for a predetermined time; and stopping the wiper in the high park position when the timer has indicated that the predetermined time has expired.

* * * * *